F. P. WHITAKER.
SYNCHRONOUS DYNAMO ELECTRIC MACHINE.
APPLICATION FILED JULY 25, 1916.

1,241,317. Patented Sept. 25, 1917.

Inventor:
Frank P. Whitaker,
by Albert G. Davis
His Attorney.

UNITED STATES PATENT OFFICE.

FRANK P. WHITAKER, OF RUGBY, ENGLAND, ASSIGNOR TO GENERAL ELECTRIC COMPANY, A CORPORATION OF NEW YORK.

SYNCHRONOUS DYNAMO-ELECTRIC MACHINE.

1,241,317.

Specification of Letters Patent.

Patented Sept. 25, 1917.

Application filed July 25, 1916. Serial No. 111,230.

*To all whom it may concern:*

Be it known that I, FRANK P. WHITAKER, a subject of the King of Great Britain, residing at Rugby, in the county of Warwickshire, England, have invented certain new and useful Improvements in Synchronous Dynamo-Electric Machines, of which the following is a specification.

My invention relates to starting and self-synchronizing arrangements for rotary converters and other synchronous dynamo electric machines of the type in which a starting motor is mechanically coupled to the shaft of the synchronous machine so as to drive the same at a predetermined angular speed ratio, and is connected in series or parallel with the synchronous machine.

My invention consists in providing the primary of the starting motor with two windings adapted to give different numbers of poles, one of which has a number of poles equal to the number of poles of the synchronous machine divided by the speed ratio, and the other has a number of poles less than that of the synchronous machine divided by the speed ratio. By starting a synchronous machine by means of such a motor, no disturbance of the voltage of the alternating current mains is caused, or is an excessive current drawn therefrom.

Figure 1:
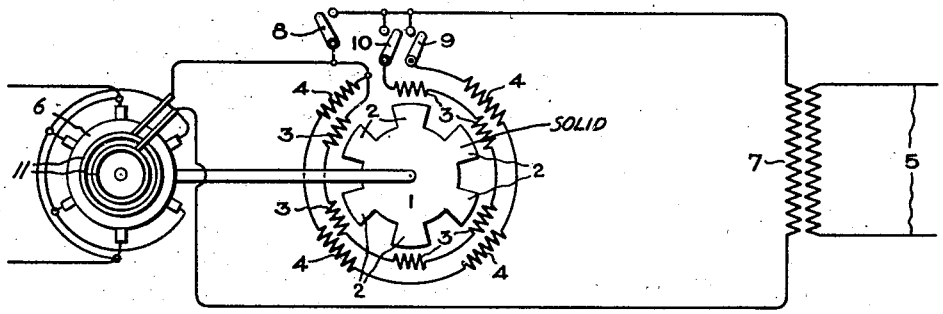
Figure 2:
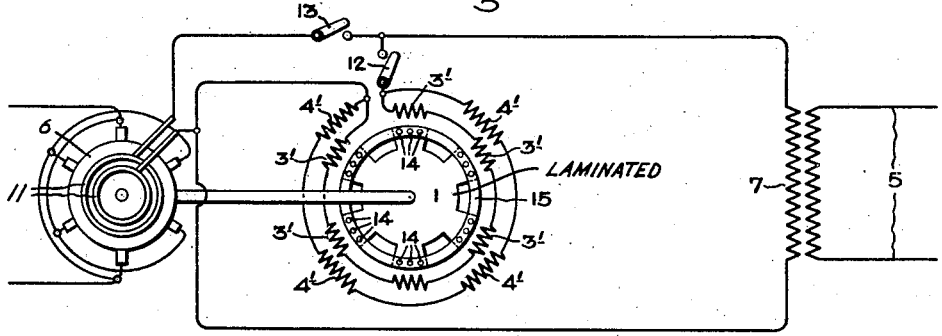
Figure 3:
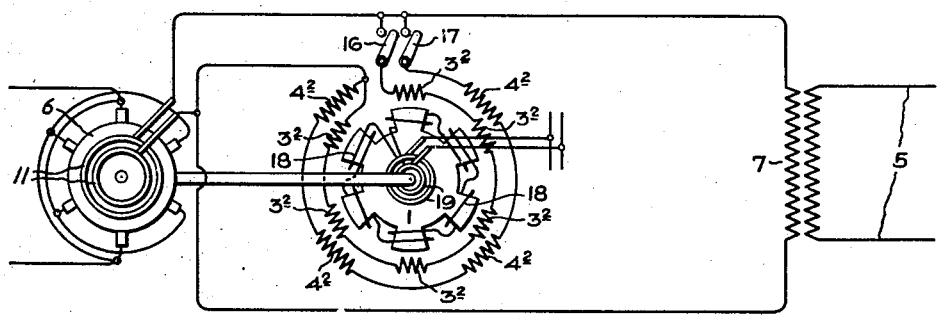
Figure 4:
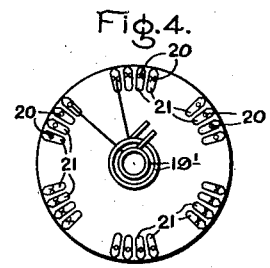

For a better understanding of my invention, reference may be had to the following description taken in connection with the accompanying drawing, in which Figures 1, 2 and 3 are diagrams showing embodiments of my invention, and Fig. 4 shows a form of rotatable member for the starting motor.

For convenience of description it may be assumed that the synchronous machine to be started and brought into synchronism with the alternating current supply is a six-pole rotary converter and for simplicity the arrangements are shown for single phase supply, although in practice it will be more usual to deal with current of three, four, or six phases. For this reason no device for producing phase displacement for starting the single phase starting motor is shown.

Referring now to Fig. 1, the starting motor which is preferably mounted on the same shaft as the rotary converter has a rotatable member 1, which is shown as having six salient poles 2 of solid iron equal in number to the poles on the rotary converter.

The primary is provided with two windings 3 and 4, of which winding 3 is arranged for six poles and winding 4 is arranged for four poles. Since the rotary converter has six poles the synchronous speed of the converter will be $\frac{f}{3}$ per second where $f$ denotes the frequency of the alternating current supply. When the starting motor is running with its six pole winding only excited the normal speed of the starting motor will be slightly below $\frac{f}{3}$ per second when the slip is small and when it is running with its four pole winding only excited its speed will approach $\frac{f}{2}$ per second namely a higher speed than the normal speed of the converter.

In Figs. 1 to 3 inclusive, alternating current mains 5 are connected to the armature 6 of the rotary converter through a transformer 7; the field winding of the converter is not shown.

In Fig. 1, the windings 3 and 4 of the starting motor are arranged to be connected in series with the armature winding 6 of the converter and in parallel with each other.

In starting up the set according to Fig. 1, the switches 8, 9 and 10 being open, the oil switch (not shown) on the high tension side of the transformer is closed. Switch 9 is then closed so that alternating current is supplied from the secondary of transformer 7 through the four pole winding 4 on the primary member of the starting motor to the armature 6 of the converter through the slip rings 11. The set starts up and the slip of the starting motor diminishes until a speed higher than the normal speed of the converter is reached. Switch 10 is then closed and switch 9 opened and the set is allowed to slow down toward the normal speed of the converter. When the converter reaches its normal or synchronous speed, the switch 8 is closed so as to short-circuit the starting motor and switch 10 may then be opened.

In some cases we may close switches 9 and 10 simultaneously at the commencement of the starting operation and allow the set to be started up with both motor windings 3 and 4 excited. When the synchronous speed is reached switch 8 is then closed to short-circuit the windings.

According to the arrangement shown in

Fig. 2, the motor primary windings 3' and 4' are connected in parallel with each other and in parallel with the converter armature. The windings 3' and 4' in this case are controlled by a single switch 12 so that during the starting operation both windings are excited and the synchronous speed for the motor will be intermediate $\frac{f}{3}$ and $\frac{f}{2}$ per second and by allowing for the slip the normal speed may be approximately $\frac{f}{3}$ per second.

When the converter reaches normal speed, the switch 13 is closed, and switch 12 opened. In this figure, a modified form of the rotatable member of the starting motor is shown. In this case the core is composed of laminations and in order to give the machine the characteristics of an induction motor it is provided with a squirrel cage or damping winding of appropriate resistance consisting of bars 14 laid in open or tunnel slots in the polar faces and short-circuited at the ends of the machine by means of the end rings 15.

Fig. 3 shows a modification of the arrangement according to Fig. 2 in which each winding $3^2$ and $4^2$ is independently controlled by a switch 16 and 17 respectively. According to this arrangement the set may be started rather more rapidly on the four pole motor winding and synchronized on the six pole winding. When it is desired to apply continuous current excitation to the rotatable member of the motor the polar projections are wound with coils 18 and continuous current is supplied through the slip rings 19 as shown. In this figure it is assumed that the polar projections are solid but if a laminated core is used a squirrel cage or damping winding as in Fig. 2 will be necessary.

According to Fig. 4 no salient poles are provided on the rotatable member but the same effect is obtained by the arrangement of the continuous current winding 20. As shown the rotatable member is provided with six groups of slots 21 four in each group and the winding is taken through the slots in such a manner that six poles alternately N and S are obtained when continuous current is applied to the slip rings 19'. In this case also the core may be solid without a squirrel cage or it may be laminated and provided with a squirrel cage.

When the starting motor is provided with a rotor as in Figs. 3 and 4, it combines the characteristics of an induction motor and a synchronous motor like the well-known self-starting synchronous motor.

The invention may be applied to rotary converters and other synchronous machines with any desired number of poles and wound for any usual number of phases. The starting motor may have any of the types of rotatable members shown, or any other usual type. If the motor and synchronous machine are mechanically connected so as to run at different angular speeds, the number of poles in one of the primary windings of the motor will be equal to and the number of poles in the other of the primary windings will be less than the number of poles of the synchronous machine divided by the angular speed ratio and the number of poles in the rotatable member of the motor will be preferably equal to the number of poles of the rotary divided by the ratio of the angular speeds. Further, transformers may or may not be introduced between the mains and the motor or synchronous machine as is usual in such systems, and I aim in the appended claims to cover all such modifications, as well as any others which do not depart from the spirit and scope of my invention.

What I claim as new and desire to secure by Letters Patent of the United States, is:—

1. In combination, alternating current mains, a synchronous dynamo electric machine, and means for starting said machine comprising an alternating current motor, the rotatable member of which is mechanically connected to the rotatable member of said synchronous machine so as to drive the same at a predetermined angular speed ratio, said motor having two primary windings of different pole numbers, the number of poles of one of said windings being equal to the number of poles of said synchronous machine divided by said speed ratio and the number of poles of the other of said windings being less than the number of poles of said synchronous machine divided by the speed ratio.

2. In combination, alternating current mains, a synchronous dynamo electric machine, and means for starting said machine comprising an alternating current motor, the rotatable member of which is mechanically connected to the rotatable member of said synchronous machine so as to drive the same at a predetermined angular speed ratio, said motor having two primary windings of different pole numbers, the number of poles of one of said windings, and of said rotatable member of the motor being equal to the number of poles of said synchronous machine divided by said speed ratio and the number of poles of the other of said windings being less than the number of poles of said synchronous machine divided by the speed ratio.

3. In combination, alternating current mains, a synchronous dynamo electric machine, and means for starting said machine comprising an alternating current motor, the rotatable member of which is mechanically connected to the rotatable member of said synchronous machine so as to drive the same at a predetermined angular speed ratio, said motor having two primary windings of different pole numbers, connected in series with the windings of said synchronous machine, the number of poles of one of said windings being equal to the number of poles of said synchronous machine divided by said speed ratio and the number of poles of the other of said windings being less than the number of poles of said synchronous machine divided by the speed ratio.

4. In combination, alternating current mains, a synchronous dynamo electric machine, and means for starting said machine comprising an alternating current motor, the rotatable member of which is mechanically connected to the rotatable member of said synchronous machine so as to drive the same at a predetermined angular speed ratio, said motor having two primary windings of different pole numbers, connected in series with the windings of said synchronous machine, the number of poles of said windings, and of said rotatable member of the motor being equal to the number of poles of said synchronous machine divided by said speed ratio and the number of poles of the other of said windings being less than the number of poles of said synchronous machine divided by the speed ratio.

In witness whereof, I have hereunto set my hand this third day of July, 1916.

FRANK P. WHITAKER.

Witnesses:
 CHARLES H. FULLER,
 J. A. FOSTER.